United States Patent [19]

Mieville

[11] 3,914,286
[45] Oct. 21, 1975

[54] LOWER ALKYL ESTERS OF P-BENZOYLPHENOXY ISOBUTYRIC ACID

[75] Inventor: Andre Mieville, Lausanne, Switzerland

[73] Assignee: Orchimed S.A., Switzerland

[22] Filed: Feb. 2, 1970

[21] Appl. No.: 8,071

[30] Foreign Application Priority Data
Jan. 31, 1969 Switzerland.......................... 1517/69
Aug. 28, 1969 Switzerland....................... 13022/69

[52] U.S. Cl.260/473 G; 260/247.7 H; 260/268 BC; 260/268 MK; 260/268 H; 260/293.76; 260/326.8; 260/471 R; 260/473 R; 260/500.5 H; 260/517; 260/520; 260/521 R; 260/559 B; 424/248; 424/250; 424/267; 424/274; 424/308; 424/309; 424/317; 424/319; 424/324

[51] Int. Cl.[2]......................................... C07C 69/76

[58] Field of Search............ 260/521 R, 473 G, 517

[56] References Cited
UNITED STATES PATENTS

| | | | |
|---|---|---|---|
| 3,379,755 | 4/1968 | Schultz et al. | 260/521 R |
| 3,383,411 | 5/1968 | Schultz et al. | 260/521 R |
| 3,494,957 | 2/1970 | Nakanishi et al. | 260/473 G |
| 3,704,314 | 11/1972 | Cragoe et al. | 260/520 |

FOREIGN PATENTS OR APPLICATIONS

| | | |
|---|---|---|
| 43-9539 | 4/1968 | Japan |
| 6,600,044 | 7/1966 | Netherlands |
| 43-14929 | 6/1968 | Japan |

OTHER PUBLICATIONS

Nakanishi et al., Yakugaku Zasshi, 90 (8), (1970) 921.
Merkel et al., C.A. 59, 5537f (1963).
Zawadowska C.A. 61, 8225h (1964).
Ainsworth et al., J. Med. Chem. 10(2), 158 (1967).
Torres, C.A. 20 2158[8].
Corse et al., C.A. 43, 3364f (1949).
Oki et al., C.A. 56, 1071c.
Brewster et al., "Organic Chemistry," Prentice–Hall, Inc., N.J. (1961) p. 602.

*Primary Examiner*—John F. Terapane
*Attorney, Agent, or Firm*—Robert E. Burns; Emmanuel J. Lobato; Bruce L. Adams

[57] ABSTRACT

Derivatives of p-alkyl-carbonyl-phenoxy-alkyl- and ca-rboxy-phenoxy-alkyl-carboxylic acids complying to the general formula:

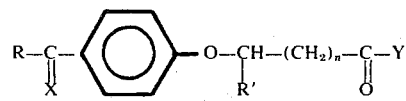

where R represents —H, NH$_2$; (—CH$_3$C$_2$H$_5$, C$_3$H$_7$, or the ω halogen derivatives of these groups); C$_6$H$_5$; —OH, —OCH$_3$, OC$_2$H$_5$, NHOH or

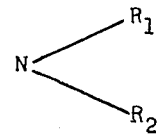

where R$_1$ and R$_2$ can be linear radicals such as —CH$_3$ or —CH$_2$—CH$_3$ or can be a ring such as that of piperidine, methyl-2-piperidine, piperazine, morpholine, pyrrolidine, methyl-4-piperidine, N-phenyl-piperazine, N-p-methoxy-phenyl-piperazine, N-methyl-4-piperazine, N-p-chlorophenyl-piperazine or hexamethyleneimine or ethylamino-ethyl-amine;

X represents =O or =N—O—H;

R—C— represents —C ≡ N;
 ||
 X n is 0, 1, 2 or 3 normal or iso when R' is —H and
n is 1, 2, 3 when R' is —C$_6$H$_5$;
R' represents —H or C$_6$H$_5$; and
Y represents —OH —OCH$_3$; —OC$_2$H$_5$; NHOH or

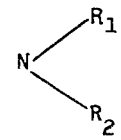

where R$_1$ and R$_2$ can be linear radicals such as —CH$_3$ or —CH$_2$—CH$_3$ or can be represented by a ring such as that of piperidine, methyl-2-piperidine, piperazine, morpholine, pyrrolidine, methyl-4-piperidine, N-phenyl-piperazine, N-p-methoxy-phenyl-piperazine, N-methyl-4-piperazine, N-p-chlorophenyl-piperazine or hexamethyl-eneimine or ethylamino-ethyl-amine. These compounds have neurotrope, anti-inflammatory and normo-lipid activity.

2 Claims, No Drawings

LOWER ALKYL ESTERS OF P-BENZOYLPHENOXY ISOBUTYRIC ACID

The invention concerns new derivatives of phenoxy-alkylcarboxylic acids and their method of preparation, characterized in that para-hydroxy-benzaldehyde, a para-hydroxy-phenone, or p-hydroxy-benzoic acid is condensed with chloro-acetic acid or one of the superior homologs thereof, the acid or the diacid obtained being possibly converted afterwards.

The acid obtained can be converted into an ester according to the classic sulfuric esterification method in the presence of a chosen alcohol.

The ester obtained can be also converted into an

by boiling to reflux in the presence of chosen aromatic or aliphatic amine or its derivatives.

The amide can also be obtained from an acid chloride according to the usual methods, from the corresponding acid.

The aldehyde or ketone function is converted into an oxime by heat treatment in the presence of hydroxylamine chlorohydrate.

The acid obtained is possibly converted into its halogenated para-ω derivative by the addition of a halogen to a solution of the said acid in acetic acid in the presence of acetic anhydride.

The para-ω halogen derivatives of the acid can also be converted into an ester, amide or oxime.

The ester or oxime can also be converted into phenoxy-alkyl, carbohydroxamic acid by bringing them to reflux in ethyl alcohol containing hydroxylamine and sodium.

The dehydration of the para-formyl-oxime-phenoxy-alkyl carboxylic acid esters by boiling to reflux in the presence of acetic anhydride gives new chemical bodies which are the esters of para-cyano-phenoxy-alkyl-carboxylic acids. The corresponding amides are obtained by boiling the said esters in the chosen amine.

The esters of para-cyano-phenoxy-alkyl-carboxylic acids are converted into para-carboxyamide-phenoxy-alkyl-carboxylic acids by oxygenated water in a warm alkaline medium. These acids can be, in their turn, esterified then converted into an amide.

According to another characteristic of the invention the para-carboxy-phenoxy-alkyl-carboxylic acids or diacids obtained according to the general process can then be submitted to an esterification or an amidification or can be converted into a corresponding hydroxamic acid.

In particular acids of the above formula, i.e. wherein Y = OA and the alkyl chain is isobutyric, such as p-carboxyl-,p-formyl-, p-acetyl-, p-propionyl-, p-butyryl- or benzoylphenoxyisobutyric acids are obtained from sodium phenate and chloroform in an alkaline medium.

The new compounds obtained by these processes are particularly remarkable for their therapeutic applications in neurotrope, anti-inflammation, normo-lipemiant medicines, for example.

The formulae of the chemical compounds according to the invention are characterized by the presence on a phenyl ring of a ketone or aldehyde group, convertible into an oxime, acid, ester, amide, hydroxamic or nitrile acid in the para position in relation to the oxyalkyl group, or by the presence of a halogen in the ω position of the chain in the para position in relation to the oxyalkyl group, and by the presence of an oxy-alkyl chain of 2,3 or 4 carbon atoms supporting an acid, ester, amide or carbohydroxamic function.

The derivatives according to the invention comply to the general formula:

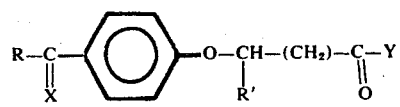

wherein R is —H or $NH_2$, —$CH_3$; —$CH_2$—$CH_3$; —$CH_2$—$CH_3$; —$C_6H_5$ or the ω halogen derivatives of the preceding groups, —OH; —$OCH_3$; —$OC_2H_5$;

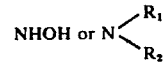

(where $R_1$ and $R_2$ can be linear radicals such as —$CH_3$ or —$CH_2CH_3$ or a cycle such as piperidine, methyl-2-piperidine, piperazine, morpholine, pyrrolidine, methyl-4-piperidine N-phenyl-piperazine, N-p-methoxy-phenyl-piperazine, N-methyl-4-piperazine, N-p-chlorophenyl-piperazine or hexamethyleneimine or ethylaminoethylamine).

X is =O or =N—O—H

may represent —C≡N
R' is —H, or —$C_6H_5$
n = 0, 1, 2, or 3 normal or iso for R' = H and
n = 1, 2 or 3 for R' = $C_6H_5$;
Y is —OH; —$OCH_3$; —$OC_2H_5$, or —

(where $R_1$ and $R_2$ can be linear radicals such as —$CH_3$ or —$CH_2CH_3$ or represented by a cycle such as piperidine, methyl-2-piperidine, piperazine, morpholine, pyrrolidine, methyl-4-piperidine, N-phenyl-piperazine, N-p-methoxy-phenyl-piperazine, N-methyl-4-piperazine, N-p-chlorophenyl-piperazine or hexamethyleneimine, or ethylamino-ethylamine).

The invention will be better understood by referring to the following description detailing the preparation of some of the new chemical compounds by way of example.

A : Synthesis of p-keto-alkyl-carboxylic or p-formylalkyl-carboxylic acids and their derivatives.

I — Synthesis of acids 0.6 mole of NaOH
0.3 mole of p-hydroxy-benzaldehyde or of p-hydroxyacetophenone or of its superior homologs pro-prophenone and butyrophenone.

0.3 mole of chloroacetic, chloropropionic or chlorobutyric-acids are introduced into a balloon-flask containing 600 ml. of water.

The solution is brought to reflux boiling for 8 hours. After cooling it is acidified to a pH of 3 with 12 N HCl. The acid precipitates and is filtered. The product obtained is redissolved in ether and extracted by an acidified aqueous solution. The acid is recrystallized in water by cooling to the ambient temperature.

The average yield of this operation is in the order of 65%.

By this method of synthesis five types of products deriving from para-formyl-phenoxy-alkyl-carboxylic acid, from paraacetyl-phenoxy-alkylcarboxylic acid, from para-propionyl-phenoxyalkyl-carboxylic acid, from para-butyryl-phenoxy-alkyl-carboxylic acid and from para-benzoyl-phenoxy-alkyl-carboxylic acid and from para-benzoyl-phenoxy-alkyl-carboxylic can be obtained.

The alkyl derivatives corresponding to each of the five series can be an acetic or propionic chain (normal or iso).

In order to obtain the homologs of these five series for which the alkyl link is an isobutyric link, a slightly different method must be employed, which consists of: in a three column balloon flask of 1,000 cm.$^3$, provided with mechanical stirrer and a reflux refrigerant surmounted by a $CaCl_2$ column is introduced 0.1 mole of a para-hydroxyphenylketone dissolved in 100 ml. of anhydrous acetone.

Under agitation 0.5 of NaOH is pulverized pastiles is added. It is brought up to reflux by heating in a water bath maintaining the agitation. Sodium phenate precipitates after about 15 to 20 minutes.

10 ml. of anhydrous $CHCl_3$, diluted in 20 ml. of anhydrous acetone is introduced by a bromine flask.

Reflux heating is then continued for 4 hours. 300 ml. of water is then added and the evaporation of the acetone is obtained in a vacuum. The aqueous solution is then acidified to pH 3 with 12N HCl then extracted twice with 200 ml. of ether.

The etheral solution is extracted twice, each time with 150 ml. of saturated solution of sodium bicarbonate.

By acidification of the carbonate solutions to pH 3 with 12N HCl, an oil is formed which is extracted with 400 ml. of ether. The etheral solution is poured off, dried with $Na_2SO_4$, then evaporated in a vacuum.

The phenoxy-isobutyric acid solidifies. It is recrystallized in a mixture of alcohol and water.

Then phenoxy-isobutyric acids obtained according to this method are synthesized with a yield of 50%.

By way of example, the following products exhibit the following particular properties;
a. Para-butyryl-phenoxy-isobutyric acid
Fusion point : 88°C.
Soluble in ether, alcohol and acetone
Insoluble in water
b. Para-benzoyl-phenoxy-isobutyric acid:
Fusion point 130°C.
Soluble in ether, alcohol and acetone
Insoluble in water II — Esterification 10 g. of an acid obtained in I are dissolved in 150 ml. of methanol, ethanol or propanol. 150 ml. of anhydrous benzene 1 ml. of 36N $H_2SO_4$ are gradually added to a flask. After boiling to reflux for 2 hours, the azeotrope benzenealcohol is distilled unitl all the benzene is eliminated.

The alcoholic solution is next concentrated in a vacuum. The oil obtained is recovered with 200 ml. ethyl ether; the solution is washed in water then dried on $Na_2SO_4$. After concentration of the etheral solution in a vacuum the ester is obtained in the form of a yellow oil or a crystallized form according to the case.

EXAMPLES a. The ethyl ester of the p-acetyl-phenoxy-isobutyric acid is obtained after dissolving the acid in absolute ethanol, the addition of benzene and $H_2SO_4$, boiling to reflux then purification; it is a liquid soluble in alcohol, ether and chloroform, and in water; its boiling point is 120°C. at 0.03 mm. Hg. The yield of the preparation is in the neighborhood of 85%.

b. The ethyl ester of para-butyryl-phenoxy-isobutyric acid is obtained under the same conditions from p-butyryl-phenoxyacetic acid, with a yield of 70 %. It is a liquid soluble in alcohol and ether, insoluble in water and its boiling point is 144°C. at 0.05 mm. Hg.

III — Amidification

1. From esters

The esters may be converted into amides by boiling to reflux in the presence of an aliphatic or aromatic amine.

8 g. of an ester is obtained and dissolved in about 25 ml. of an amine previously dried on potash. The solution is refluxed for 3 hours. The amine generally crystallizes by simple cooling or by the addition of a slight quantity of water. The complete precipitation is obtained by the slow addition of 200 to 300 ml. of water. Purification is carried out by recrystallization in a mixture of alcohol and water.

2. From acid chlorates

It is possible to treat the acid chlorates obtained according to the usual methods, in the same conditions as that above in III (1) in the presence of amine in order to obtain the required amide.

The following are given by way of example:

a. Morpholine amide of p-formyl-phenoxyacetic acid is obtained according to 1 to 2 above. The yield is 65% and the product is soluble in alcohol and insoluble in water; the fusion point for the amide is 116°C.

b. The amide of p-chlorophenyl-4-piperazine and of the p-formyl-phenoxyacetic acid is obtained by methods described in 2 above, with a yield of 45%; its fusion point is 120°C c. The amide of p-chlorophenyl-4-piperazine and of p-acetyl-phenoxyacetic acid is obtained according to 1 above with a yield of about 40%. Its fusion point is 115°C.; it is soluble in alcohol, slightly soluble in ether, and insoluble in water petroleum ether and hexane.

d. (p-Acetyl-phenoxy-acetyl)-1-morpholine is obtained according to 1 above. It is soluble in alcohol, insoluble in water, and petroleum ether. Its fusion point is 112°C., with a yield of 60%.

e. (p-Acetyl-phenoxy-acetyl)-1-methyl-4-piperidine is obtained according to 1 above with a yield in the order of 40%; its fusion point is 60°C.; it is soluble in alcohol and ether, insoluble in water and petroleum ether.

f. (p-Acetyl-phenoxy-acetyl)-1-hexamethyleneimine is obtained according to 1 above with a yield of 50%; it is soluble in alcohol and ether insoluble in water. Its fusion is 78°C.

g. N-(p-Acetyl-phenoxy-acetyl)-diethylamino-ethyl-amine is obtained according to 1 above, with a yield of 35%. It is insoluble in water and petroleum ether, soluble in alcohol and ether, and its fusion point is 75°C.

h. N-(p-Formylphenoxy-acetyl)-piperidine is obtained by the treatment indicated above in 1 or 2. A crystallized product is obtained having a fusion point of 96°C.; it is soluble in ether, alcohol and most organic solvents and insoluble in petroleum ether and water. The yield of the preparation is about 60%.

i. N-(p-Acetylphenoxy-acetyl)-piperidine is obtained under the conditions described in 1 above. a crystallized product is obtained, the fusion point of which is 97°C. with a yield of about 60%. This product is soluble in alcohol and most organic solvents, but insoluble in water and petroleum ether.

The amides complying to the general formula for which R' = $C_6H_5$ are also obtained by applying the processes 1 and 2 above.

IV — Production of oximes

The oxime is obtained by condensation of the aldehyde or ketone function of the compounds described above with hydroxylamine.

0.1 mole of an amide obtained as in III is made into a solution with 500 ml. of absolute ethanol; 7 g. of hydroxylamine and chlor- hydrate and 5.8 g. of soda are added to the solution which is then refluxed for 3 hours. After the addition of 100 ml. of water, the oxime precipitates in the water-alcoholic solution, by concentration in a vacuum. After filtration, the oxime is purified by recrystallization in a mixture of alcohol and water.

Examples a. The N-(p-isonitrosomethyl-phenoxy-acetyl)-piperidine is obtained in the above conditions. The crystallized oxime is obtained with a yield of about 70%; its fusion point is 135°C. It is soluble in alcohol but insoluble in water.

b. N-(p-Isonitrosomethyl-phenoxy-acetyl)-morpholine is obtained under the above conditions. It is soluble in alcohol, insoluble in water, its fusion point is 169°C. and the yield is 60%.

c. p-(1-Isonitrosoethyl)-phenoxy-acetic acid is obtained under the previous conditions for this variant after an alkaline pH is obtained by the addition of piperidine used in equimolecular proportions with the chlorhydrate of hydroxylamine. The product is obtained with a yield of 55%. It is soluble in alcohol and bicarbonated water, insoluble in water.

d. Ethyl p-(1-isonitrosoethyl)-phenoxy-acetate is obtained under the same conditions as for (b) from the ester of p-acetyl-phenoxy-acetic acid with a yield of 65%. It is soluble in alcohol, insoluble in water. Its fusion point is 103°C.

e. N-(p-[1-Isonitrosoethyl]-phenoxy-acetyl)-piperidine is obtained by condensation of the corresponding amide with chlorhydrate of hydroxylamine in alcohol in the presence of soda, boiling to reflux, then purification. The yield is 70%. The product is soluble in alcohol and insoluble in water; its fusion point is 168°C.

f. N-(p-[1-Isonitrosoethyl]-phenoxy-acetyl)-morpholine is obtained according to the same process with a yield of 70%. The product is soluble in alcohol, insoluble in water. Its fusion point is 145°C.

g. N-(p-[-Isonitrosoethyl$\pi$-phenoxy-acetyl)-4-methylpiperidine is obtained with a yield of 60%. The product is soluble in alcohol, insoluble in water; its fusion point is 166°C.

h. N-(p-[1-Isonitrosoethyl]-phenoxy-acetyl)-4-(p-chlorophenyl)-piperazine is obtained with a yield of 60%. The product is soluble in alcohol, very slightly soluble in ether, insoluble in water. Its fusion point is 194°C.

i. N-(p-[1-Isonitrosoethyl]-phenoxy-acetyl)-hexamethyleneimine is obtained with a yield of 60%. It is soluble in alcohol, insoluble in water. Its fusion point is 134°C.

j. N-(p-[1-Isonitrosoethyl]-phenoxy-acetyl)-diethylaminoethyl amine is obtained in the above conditions with a yield of about 50%. It is soluble in alcohol, insoluble in water; its fusion point is 130°C.

The oximes derived from compounds complying with the general formula for which R' = $C_6H_5$ are also obtained according to the above process.

V — ω Halogen derivatives

Another process according to the invention consists of the conversion of the phenoxy-alkyl-carboxylic acids into their ω halogen derivatives, by the addition of a halogen to a solution of the acid in acetic acid in the presence of acetic anhydride. The formula for the resultant ω-derivative remains consistent with the general formula in which R signifies $ACH_2-(CH_2)_{n'}$, A representing a halogen and n' = 0, 1, 2, 3 normal or iso.

The fixing of the halogen on the chain, bromine for example, is obtained by the action of the bromine on phenoxy-alkylcarboxylic acid diluted in acetic acid. The bromine is added to the solution drop by drop in the presence of acetic anhydride, the precipitate obtained being washed and recrystallized after being dissolved in boiling water.

Such halogen ω-acids complying to the general formula can be converted into their esters, amides, and oximes by application of the methods described in II, III and IV.

Examples

1 - p-(ω-Bromo-acetyl-phenoxy)-acetic acid is obtained by bromination as described above.

The product is obtained with a yield of about 70%. Its fusion point is 183°C. It is soluble in alcohol and in warm water, insoluble in cold water.

2 - Ethyl p-(ω-bromo-acetyl-phenoxy)-acetate is obtained by esterification of the preceding acid conforming to the conditions described in II with a yield of about 90%. The product is soluble in alcohol, benzene and insoluble in water. Its fusion point is 80°C.

3 - N-(p-[ω-Bromo-acetyl-phenoxy]-acetyl)-piperidine is obtained by condensation of the previous ester and of the piperidine in the condiitons described in III (1) = with a yield pf about 50%. The product is soluble in warm alcohol, insoluble in water, and its fusion point is 96°C.

4 - N-(p-[2-Bromo-1-isonitrosoethyl]-phenoxy-acetyl)-piperidine is obtained by condensation of the previous product with hydroxylamine in the presence of soda, with a yield in the order of 40%. It is soluble in the usual solvents, its point of fusion is 220°C.

VI — Phenoxy-alkyl-carbohydroxamic acids and their derivatives

Phenoxy-alkyl-carboxylic acids and their derivatives of the general formula:

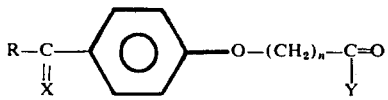

can be converted in order to obtain the phenoxy-alkyl-carbohydroxamic acids and their derivatives where Y is NHOH.

The general method consists of dissolving the corresponding esters or their p-alkyl-oxime derivatives in ethyl alcohol containing hydroxylamine and sodium, bringing the mixture to reflux, then precipitating the acid from the solution obtained after having previously had the alcohol removed in an acid medium.

EXAMPLES a. p-Isonitrosomethyl-phenoxy-aceto-hydroxamic acid is obtained by dissolving in 500 ml. of alcohol:

2 gram atoms of sodium, 1 mole of hydroxylamine chlorhydrate, and 1 mole of ethyl p-isonitrosomethyl-phenoxy-acetate obtained according to (IV) or 3 gram atoms of sodium, 2 moles of hydroxylamine chlorhydrate and of ethyl p-formyl-phenoxy-acetate obtained according to (II).

After boiling to reflux, the NaCl formed is eliminated by filtration; 200 ml. of water is added and the alcohol evaporated in a vacuum. The aqueous solution is acidified to pH 3. The precipitate obtained is filtered and recrystallized in alcohol.

The product is obtained with a yield of about 50%. It is soluble in alcohol, insoluble in water, its fusion point is 198°C.

b. p-(1-Isonitrosoethyl)-phenoxy-aceto-hydroxamic acid is obtained according to the previous procedure from ethyl p-oximephenoxy-acetate or ethyl p-acetyl-phenoxy-acetate with a yield of 55%.

VII — para-Cyano-alkyl-carboxylic acids

Another process according to the invention consists of transforming the p-formyl-phenoxy-alkyl-carboxylic acids of such type that their general formulae would be:

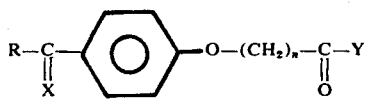

with X representing N-OH; R representing NH₂ or

may represent —C≡N and Y and n as hereinbefore defined.

The process consists of dehydrating the esters of p-isonitrosomethyl-phenoxy-alkyl-carboxylic acids with acetic anhydride by boiling to reflux. The esters of cyano-phenoxy-alkylcarboxylic acids are thus obtained. The corresponding amides can be obtained by boiling to reflux the preceding compounds dissolved in the corresponding amine or by dehydration of the N-(p-isonitrosomethyl-phenoxy-alkyl)-amide with acetic anhydride.

The p-cyano-phenoxy-alkyl-carboxylic acids can be converted into p-carboxamido-phenoxy-alkyl-carboxylic acids by oxygenated water in a warm alkaline medium. These acids can be esterified then converted into amides according to the methods described in II and III.

The N-(p-carboxamido-oxime-phenoxy-alkyl)-amides are obtained directly from the p-carboxamido-phenoxy-alkyl-carboxylic acids, by amidification according to III.

EXAMPLES a. Ethyl p-cyano-phenoxy-acetate is obtained by the following successive operations:

Conversion of the ethyl p-formyl-phenoxy-acetate into its oxime is carried out by condensation of hydroxylamine chlorhydrate in the presence of anhydrous pyridine in equimolecular proportions by boiling to reflux.

After recrystallization of the previous compound, 15 g. of this product are brought to reflux in 100 ml. of acetic anhydride. It is next hydrolyzed with 100 ml. of warm water; after cooling, it is made alkaline with 100 g. of sodium bicarbonate and the p-cyano derivative is precipitated and recrystallized in the minimum of alcohol.

Thus, 9.5 g. of the product are obtained, its fusion point being 57°C.

b. p-Carboyamido-phenoxy-acetic acid is obtained by the action of 15 ml. of H₂O₂, 110 volumes O (equivalent to 30% by wt. of H₂O₂), on 8 g. of the previous product warmed in 100 ml. of water containing 3 g. of potash. After cooling, the acid is precipitated by the addition of 12N HCl up to a pH of 3. 7 g. of acid are obtained; its fusion point is 250°C.

c. Ethyl p-carboxamido-phenoxy-acetate is obtained by boiling to reflux 8 g. of the previous acid in 100 ml. of absolute alcohol and 100 ml. of benzene. After distillation of the azeotrope, it is concentrated in a vaccum, the ester precipitates and it is next recrystallized in the minimum of alcohol to 95% of alcohol. 5 g. of ester are obtained; its fusion point is 143°C.

d. N-(p-Carboxamido-phenoxy-acetyl)-piperidine is obtained from the preceding ester according to the method described in III (1) with a yield in the order of 55%. Its fusion point is 168°C.

e. N-(p-Cyano-phenoxy-acetyl)-piperidine is obtained either by dehydration from N-(p-isonitrosomethyl-phenoxy-acetyl)-piperidine by warm acetic anhydride or by the treatment with ethyl p-cyano-phenoxy-acetate according to the process described in III (1). The yield is 90% The product has a fusion point of 112°C. It is soluble in alcohol and in ether, insoluble in water.

f. N-(p-Carboxamido-oxime-phenoxy-acetyl)-piperidine is obtained by the process described in IV from the previous amide with a yield of 40%. Its fusion point is 180°C. It is insoluble in water, soluble in alcohol.

B — Synthesis of p-carboxy-phenoxy-alkyl-carboxylic acids and their derivatives

I — Synthesis of the acids

In general, p-carboxyphenoxyalkyl-carboxylic acids may be obtained by condensation of p-hydroxybenzoic acid with chloroacetic acid or its higher homologs, by boiling to reflux.

The p-carboxy-phenoxy-alkyl-carboxylic acids are obtained in the following manner:

3 moles of soda pellets, 1 mole of p-hydroxy-benzoic acid and 1 mole of chloro-acid are brought to reflux in 1.3 liters of water then immediately acidified to a pH of 3. The diacid precipitates, is isolated by filtration, washed in water then alcohol, and the product is obtained in a yield of about 80%.

EXAMPLES p-Carboxy-phenoxy-acetic acid is obtained by boiling to reflux with 120 g. of soda, 138 g. p-hydroxy-benzoic acid and 95 g. of chloroacetic acid in 1.3 liters of water, then acidification to a pH of 3. After purification, 159 g. of powder are obtained, its fusion point being 280°C.

II — Synthesis of ester, amide, and carbohydroxamic derivatives

It is possible to convert the series of p-carboxyphenoxy-alkyl-carboxylic acids into their ester, amide and carbohydroxamic derivatives according to the methods described above in AII,III and VI. The compounds obtained conform to the general formula in such a way that R can be —OH, —OCH$_3$, —OC$_2$H$_5$, NHOH or

R$_1$ and R$_2$ can be linear radicals such as CH$_3$ or CH$_2$CH$_3$ or represent a ring, such as that of piperidine, methyl-2-piperidine, piperazine, morpholine, pyrrolidine, methyl-4-piperidine, N-phenylpiperazine, N-p-methoxy-phenyl-piperazine, N-methyl-4-piperazine, N-p-chlorophenyl-piperazine, hexamethyleneimine or ethylaminoethylamine.

Y can also be —NHOH as indicated above in A VI

1. Esterification

The di-acids obtained can be esterified according to the general method described in A II. The carboxyl in the para position can also be esterified by maintaining the di-acid in suspension in the chosen alcohol at reflux under a current of HCl.

EXAMPLES a. Ethyl p-carboxy-phenoxy-acetate is obtained by boiling to reflux the previous product in a sulphuric acid medium in a mixture of ethyl alcohol and benzene. After distillation of the excess ethyl alcohol and solvent, the ester is isolated and recrystallized in benzene. The product is obtained with a yield of about 60%; its fusion point is 138°C.; it is soluble in alcohol and in bicarbonated water, and insoluble in water.

b. The diethyl di-ester of p-carboxy-phenoxy-acetic acid is obtained by boiling to reflux a saturated solution of HCl containing 75 g. of di-acid in 500 ml. of ethyl alcohol under constant bubbling with HCl. The di-acid dissolves slowly, reflux and the current HCl being continued 2 to 4 hours after completion of the dissolving.

The solution is discoloured or black, then evaporated in a vacuum, the oil obtained put into a solution with ether and washed in water, then with water saturated with sodium bicarbonate; after evaporation of the solvents the oil is distilled in a vacuum, its boiling point is 125°C. at 0.05 mm. Hg. The ester solidified; 50 g. of product is obtained and its fusion point is 32°C. It is soluble in alcohol and in ether, insoluble in water.

2 — Amidification

Amidification is obtained according to the general method described in A III.

EXAMPLES a. N-(p-Carboxy-phenoxy-acetyl)-piperidine is obtained according to the method described in A III (1), from the ester described above in B II (1a) with a yield of about 45%. Its fusion point is 190°C.; it is soluble in alcohol and in bicarbonated water, insoluble in water.

b. N-(p-Methoxy-carbonyl-phenoxy-acetyl)-piperidine is obtained from the dimethyl di-ester of carboxy-phenoxy-acetic acid, this being obtained according to the method described in BII (1). Amidification is carried out according to the general method described in A III; the yield is in the order of 74%. The product has a fusion point of 104°C. It is soluble in alcohol and ether, insoluble in water and petroleum ether.

c. N-(p-Ethoxy-carbonyl-phenoxy-acetyl)-piperidine is obtained from the diethyl di-ester described above in B II (1b) with a yield of the order of 70%, and having a fusion point of 61°C. It is soluble in alcohol and ether, insoluble in water and petroleum ether.

d. N-(p-Carboxy-phenoxy-acetyl)-morpholine is obtained according to the general method of amidification from the ester obtained as above in B II (1a), with a yield of 55%. It is soluble in alcohol and bicarbonated water, insoluble in water; its fusion point is 183°C.

e. Ethyl (p-piperidino-carbonyl)-phenoxy-acetate is obtained from the ester described in B II (1a). Previously chlorinated into the para-acid chloride by the action of PCl$_5$ in equimolecular proportions under heat, the chloride of the acid obtained is dissolved in a benzene solution, and a solution of piperidine in benzene is added to the ice bath in the proportions of 1 : 2. The amide is separated by concentration in a vacuum, and recrystallization. It is obtained with a yield of 40%. Its fusion point is 90°C. It is soluble in alcohol and is ether, insoluble in water.

f. p-Carboxamide-phenoxy-acetamide is obtained from carboxy-phenoxy-acetic acid, previously converted into its dichloracid derivative, by the action of NH$_4$OH. The diamide precipitates; after purification the yield is 70%. Its fusion point is 265°C. and it is insoluble in the usual solvents.

Hydroxamic acids

The corresponding hydroxamic acids are obtained according to the general method described in A VI.

What is claimed is:

1. A phenoxy compound which is a methyl, ethyl or propyl ester of p-benzoylphenoxy-isobutyric acid.

2. A compound according to claim 1 which is the ethyl ester of p-benzoylphenoxy-isobutyric acid.

* * * * *